United States Patent [19]
Sauerbrey

[11] 3,743,140
[45] July 3, 1973

[54] FILLER APPARATUS WITH HOPPER AND ROTARY FEED MECHANISM FOR DISPENSING CONTROLLED VOLUMES OF MATERIALS

[75] Inventor: Charles A. Sauerbrey, Malverne, Pa.
[73] Assignee: G. Diehl Mateer Co., Wayne, Pa.
[22] Filed: Dec. 21, 1970
[21] Appl. No.: 99,789

[52] U.S. Cl. .................... 222/63, 222/70, 222/76
[51] Int. Cl. .................................... B67d 5/14
[58] Field of Search ............... 222/63, 70, 76, 378, 222/413; 141/192; 226/9; 235/98 C, 132 E; 198/40

[56] References Cited
UNITED STATES PATENTS

| | | | |
|---|---|---|---|
| 3,305,133 | 2/1967 | Parker | 222/70 |
| 3,006,549 | 10/1961 | Hughes | 235/132 E X |
| 3,332,084 | 7/1967 | Wahrer et al. | 226/9 X |
| 3,275,208 | 9/1966 | Poumakis | 226/9 |
| 3,409,176 | 11/1968 | Krause | 222/70 |
| 2,567,422 | 9/1951 | Camp | 235/98 C |
| 3,012,720 | 12/1961 | Rappaport et al. | 235/98 C X |

Primary Examiner—Samuel F. Coleman
Assistant Examiner—Norman L. Stack, Jr.
Attorney—Seidel, Gonda & Goldhammer

[57] ABSTRACT

Apparatus for dispensing controlled volumes of materials from a hopper using a rotary feed mechanism incorporates a digital count controller responsive to a signal generator that generates digital signals in direct relation to the rotary displacement of the feed mechanism.

4 Claims, 3 Drawing Figures

INVENTOR
CHARLES A. SAUERBREY
BY
Seidel, Gonda & Goldhammer
ATTORNEYS

FILLER APPARATUS WITH HOPPER AND ROTARY FEED MECHANISM FOR DISPENSING CONTROLLED VOLUMES OF MATERIALS

This invention relates to filler apparatus for dispensing controlled volumes of material using a hopper and rotary feed mechanism. More particularly, this invention relates to a filler apparatus for accurately dispensing controlled volumes of materials into containers by controlling the feed mechanism through digital techniques.

The basic concept of accurately filling containers by dispensing materials from a conical hopper using a rotary feed mechanism is well known. See, for example, U.S. Pat. Re. No. 23,888 and Re. No. 24,079. Apparatus such as is shown in these patents can be used for volumetric filling of free-flowing and non-free-flowing granular, powdered, flaked or paste material. Typically, the feed mechanism is positioned in an opening in the bottom of a conical hopper and consists of either an auger or a pump such as a Moyno pump. The auger, pump rotor, or other rotational member is driven by a prime mover (such as an electric motor) through a clutch-brake mechanism which connects a driving shaft to a driven shaft. The clutch-brake mechanism is controlled to rotate the driven shaft for a pre-selected number of revolutions by an analog device which counts the number of revolutions. This is a relatively accurate way of volumetrically dispensing material since the amount of material dispensed by each revolution of the auger or pump is known. For example, for each revolution of an auger of known pitch and diameter, the volume of material dispensed from its discharge end is known. By appropriate control, the auger can be made to run through sequential cycles of a predetermined number of turns. During each cycle, a predetermined volume of material is discharged into a container positioned by mechanized packaging devices beneath the discharge end of the feed mechanism. Mechanized packaging line devices for sequentially positioning containers made of paper, metal, plastic or glass are well known.

Since each revolution of the feed mechanism dispenses a known amount of material, it follows that the number of revolutions is a measure of the volume of material that has been dispensed. There are two methods for determining the number of revolutions. The first method is to directly count the number of revolutions. The second method is to measure the time period over which the feed mechanism is being driven at a constant speed. In known apparatus, devices for counting the number of revolutions normally incorporate a counter directly linked by gearing to the output side of the clutch-brake mechanism mentioned above. Such devices permit the operator to preset a graduated dial to the desired number of revolutions. A compound train of spur and helical gears transmit rotational movement from the output side of the clutch-brake mechanism to a revolution count control switch. When the correct count is reached, the driven shaft is disengated from the driving shaft and brought immediately to a stop by the clutch-brake mechanism. Although such mechanisms are manufactured with precision and assembled with severe quality monitoring, inherent errors make the repetitive accuracy of performance within the range of plus or minus 0.001 to 0.0025 percent.

The timed method of controlling the number of revolutions is less accurate. Experience has shown that direct coupling to the driven member of the feed mechanism is the most accurate way of measuring count revolutions.

The present invention is directed to an apparatus for enhancing the accuracy of such apparatus for dispensing controlled volumes of materials. In particular, the present invention retains the direct, positive coupling of a revolution counting mechanism, but improves upon it by incorporating a digital technique. As an improved apparatus for controlling the number of revolutions of the rotary feed mechanism, a device for generating digital signals is directly coupled to the driven member of the feed mechanism. These digital signals are detected and counted. Such signals are accurate indications of the amount of revolution of the driven shaft. Hence, an appropriate count of digital signals is also a count of the number of revolutions or partial revolutions of the shaft. When an appropriate pre-set count has been reached, the clutch-brake mechanism can be operated in the conventional manner to stop the driven member of the feed mechanism.

It is an object of the present invention to provide an improved filler apparatus with hopper and rotary feed mechanism for dispensing controlled volumes of materials.

It is another object of the present invention to provide an improved filler apparatus with hopper and rotary feed mechanism for dispensing controlled volumes of materials that incorporates digital techniques for controlling the number of revolutions of the feed mechanism.

Yet another object of the present invention is to provide a more accurate filler apparatus with hopper and rotary feed mechanism for dispensing controlled volumes of materials.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
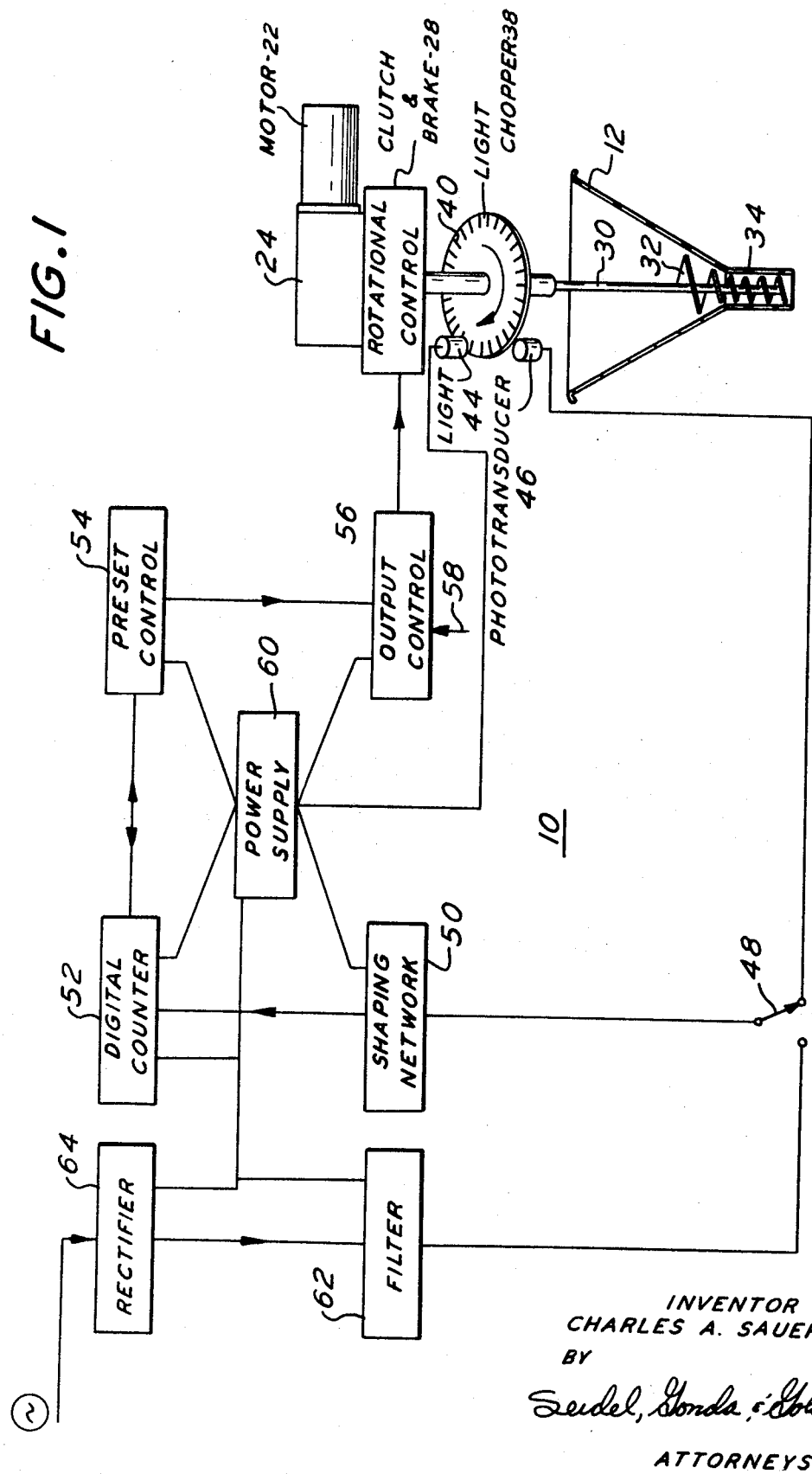
FIG. 1 is a schematic block diagram illustrating the functional elements of the filler apparatus.

Referring now to the drawings in detail, wherein like numerals indicate like elements, there is shown in FIG. 1 a filler apparatus with hopper and rotary feed mechanism for dispensing controlled volumes of materials, designated generally as 10. The apparatus is shown schematically and in block diagram form for purposes of illustrating the invention.

Figure 2:
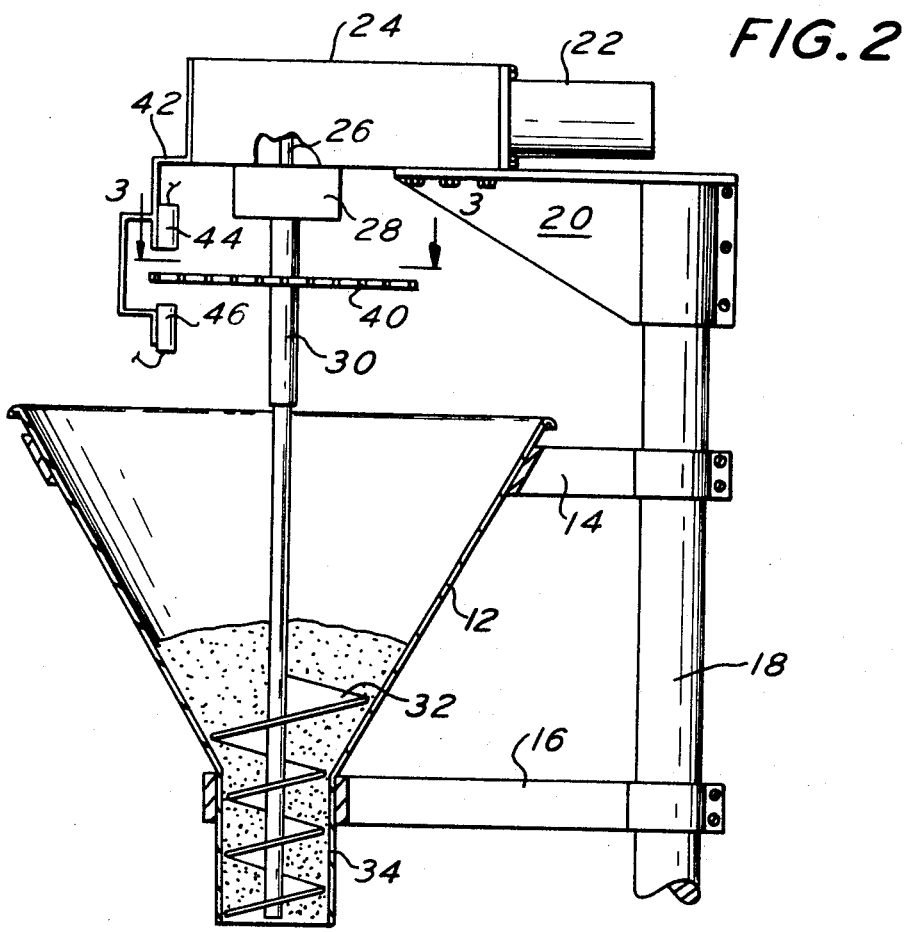
FIG. 2 is a partial sectional view of the filler apparatus.

FIG. 2 illustrates by way of example, a typical filler apparatus as comprising a hopper 12, which preferably is conical, supported by appropriate brackets and straps 14 and 16 on the column 18.

The plate 20 is mounted on the top of column 18 and supports by means of appropriate fasteners the motor 22 and the drive train 24. The motor 22 may be any form of well known prime mover such as an electric motor or even a hydraulic motor, although it is preferably an electric motor. The drive train may consist of an assemblage of belts and pulleys or, in the alternative, a gear train or transmission adapted to rotate the driving shaft 26. The driving shaft, or its equivalent, may be referred to hereinafter as a driving member.

The driving shaft 26 serves to couple the drive train 24 to the input side of the brake-clutch mechanism 28. The brake-clutch mechanism 28 serves to selectively connect the driving member 26 which takes the form of a drive shaft to the driven member 30 which in this case is a shaft connected to the auger 32. The brake-clutch mechanism may be a conventional mechanism such as the one described in U.S. Pat. Re. No. 23,888. Of course, other types of brake-clutch mechanisms which function to provide rotational control for the driven shaft 30 and hence the auger 32 may be provided.

As shown, the auger 32 is fitted within the dispensing nozzle 34 at the open bottom end of the hopper 12. Rotation of the auger 32 causes material 36 to be displaced from the hopper 12 through the nozzle 34 into containers sequentially positioned by a mechanism (not shown) beneath the hopper. It should be understood that by illustrating an auger, there is no intention to limit the invention. For example, the auger 32 could be replaced by the screw rotor of a Moyno pump such as is illustrated in U.S. Pat. Re. No. 24,079.

Also fixed to the shaft 30 so as to be rotative with it is a disc 38. The function of the disc 38 is to act as a light chopper. For this purpose, it is provided with a plurality of slots 40 evenly spaced about its periphery. The number of slots 40 can be varied. However, for convenience a preferred embodiment may have 100 slots, thereby providing a number that is divisible by 10 to indicate a complete revolution of the shaft 30 and hence the auger 32.

A bracket 42 supports a signal source 44. The source 44 may be the filament of an incandescent lamp or a gaseous lamp which is supplied with a steady electric current so as to generate a steady state light source. The bracket 42 also supports a photoconductive transducer 46, such as a phototransistor or the like, which is sensitive to the signal energy generated by the source 44.

Figure 3:
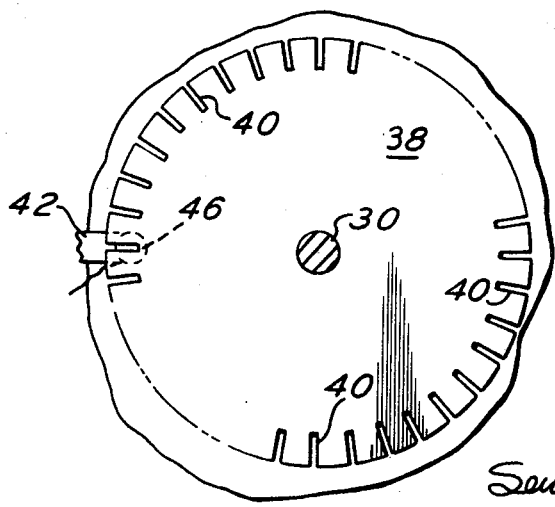
FIG. 3 is a sectional view of the filler apparatus illustrated in FIG. 2 taken along the line 3—3 to show the light chopping disc.

The source 44 and photoconductive transducer 46 are positioned by the bracket 42 in opposing relation adjacent the peripheral edge of the disc 38. Thus, signal energy emitted by the source 44 must pass through the slots 40 and the disc 38 in order to be detected by the photoconductive transducer 46. This is best illustrated in FIG. 3. As a result, the output of the photoconductive transducer 46 is a series of discrete electrical pulses whose frequency will depend upon the speed at which the shaft 30 is rotating.

It should be understood that the illustrated embodiment of disc 38 as a light chopper and the photoconductive transducer 46 is by way of example, not limitation. Obviously, other structure could be used. For example, the disc could be made stationary and the photoconductive transducer 46 rotated relative to the disc. The result would still be the generation of a series of discrete pulses generated by the blocking and unblocking of a light path for the source 44 directed toward the photoconductive transducer 46. Still further, the slots 40 could be detected by other devices to generate discrete electrical pulses. Among such devices are pneumatic or magnetic transducers, or mechanical switches, proximity sensors or other devices that generate a signal pulse corresponding to the relative displacement of rotating slots on the disc 38.

Referring now to FIG. 1, there is shown in schematic block form the elements of the circuitry for counting and controlling the number of rotations of the auger 32. As shown, the output of the photoconductive transducer 46 is connected through switch 48 to a wave shaping network 50. Wave shaping network 50 provides appropriate filters and clamping devices to shape the pulses generated by the light chopper 38 and photoconductive transducer 46 so that they may be processed by the digital counter 52. The output of the wave shaping network 50 is connected to the digital counter 52 which counts the number of discrete pulses. Digital counters are well known and hence need not be described in detail. Each pulse is a signal counted by the counter 52, and each signal represents a known unit of displacement of the shaft 30 because the slots 40 are uniformly spaced about its periphery. Hence, a specific count registered in the digital counter 52 represents a specific number of turns or partial turns of the auger 32.

The output of digital counter 52 is connected to the preset control 54 which operates in conjunction with the digital counter 52. The function of the preset control 54 is to generate a control signal when the count in digital counter 52 reaches a predetermined amount. Preset control 54 is calibrated in turns and partial turns so that an operator can set in the volume of material to be delivered by the auger 32.

When the count in digital counter reaches the preset amount in control 54, an output signal is generated and transmitted to the output control 56. Output control 56 responds by generating a signal which in turn is transferred to the rotational control 28. In the illustrated embodiment, the rotational control is a clutch-brake 28. The clutch-brake 28 responds by disengaging driving member 26 from the driven member 30 and by bringing the driven member 30 to an immediate halt.

A power supply 60 is shown for providing power to each of the elements of the block diagram.

From the foregoing, it may be seen that a direct, positive method of counting the revolutions has been provided. However, in this instance the method is digital rather than analog. Therefore, this system is no longer dependent upon interpreting mechanical or electrical resolution chains to determine the number of revolutions. Instead, a precise, closely coupled and direct system is provided. The end result is a much more accurate control over the volume of material delivered out of the hopper 12 by the feed mechanism consisting of auger 32 and nozzle 34.

Apparatus 10 such as has been described can be used in processes for dispensing dry, moist or liquid products where the delivered quantity of material exceeds the volume normally dispensed by existing apparatus. By way of example, existing apparatus is normally used to fill small containers ranging from one-half ounce to one hundred pounds maximum. Existing analog devices for counting the number of revolutions of the auger are limited to a range of approximately 120 revolutions. Such apparatus would be inadequate if more than 120 revolutions of the auger 32 are required to dispense the material of a desired volume, such as into a convention 55 gallon steel drum having a restricted bung hole opening. To fill such a container would require several thousand revolutions of the auger. The present invention can be used to fill such a container.

The foregoing is accomplished by moving the switch 48 from the illustrated position to a position wherein the shaping network 50 is connected to the filter 62. Filter 62 is in turn connected to rectifier 46 which is connected to a source of alternating current at a known frequency. The rectifier 64 converts the alternating current into a series of discrete, direct current signals which are filtered and applied to the shaping network 50. Since the frequency of the alternating current is known, the number of signals generated per unit time is also known. As a result, the amount set in the preset control 54 becomes a function of time of revolution of the shaft 30. Hence, the apparatus can be immediately converted over into a timed control type of apparatus for filling large containers.

The present invention may be embodied in other specific forms without departing from the spirit or essential attributes thereof and, accordingly, reference should be made to the appended claims, rather than to the foregoing specification as indicating the scope of the invention.

I claim:

1. A filler apparatus of the type comprising a vertical hopper and a rotary feed mechanism for dispensing controlled volumes of material into containers through an opening at the bottom of the hopper, said feed mechanism including a driven member and a driving member operated by a prime mover, rotary control means for selectively engaging and disengaging said driving member with said driven member to start and stop the dispensing of materials from the hopper, and control means for controlling the number of revolutions of the driven member by causing said rotary control means to disengage said driving means from said driven means when said driven means has rotated through a predetermined number of revolutions, said control means including electro-optical signal generating means directly connected to said driven member for generating a series of digital signals proportional to the amount of rotation of said driven member, counter means to count the number of digital signals generated, and count responsive control means connected to be responsive to a preset count by said counter means to generate a signal to operate said rotary control means to disengage the driving member from the driven member when a preset count has been reached.

2. A filler apparatus in accordance with claim 1 wherein said signal generating means for generating digital signals comprises a light chopper fixed to the driven member and a photodetector for detecting the signal energy chopped by the light chopper and transducing said detected energy into digital signals.

3. In a filler apparatus in accordance with claim 2 wherein said counter means to count the number of digital signals comprises a digital counter.

4. A filler apparatus in accordance with claim 1 including digital signal generating means to generate digital signals independent of said signal generating means for generating digital signals in response to the rotation of said driven member, and means to connect said independent digital signal generator means directly to said counter means to count the number of digital signals, and means to disconnect said signal generating means for generating digital signals in response to rotation of said driven member from said counter means to count the number of digital signals.

* * * * *

Disclaimer 3,743,140.—*Charles A. Sauerbrey*, Malvern, Pa. FILLER APPARATUS WITH HOPPER AND ROTARY FEED MECHANISM FOR DISPENSING CONTROLLED VOLUMES OF MATERIALS. Patent dated July 3, 1973. Disclaimer filed May 25, 1983, by the assignee, *Berwind Corp.*

Hereby enters this disclaimer to claims 1–4 of said patent.

[*Official Gazette December 25, 1984.*]